United States Patent
Meriaz et al.

(10) Patent No.: US 12,542,850 B2
(45) Date of Patent: Feb. 3, 2026

(54) INBOUND AND OUTBOUND COMMUNICATION SESSION AND CALL CONTROL

(71) Applicant: MBTE Holdings Sweden AB, Goeteborg (SE)

(72) Inventors: Yoram Meriaz, Tel-Aviv (IL); Ran Meriaz, Warner Robins, GA (US); Alex Tkachman, Holon (IL)

(73) Assignee: MBTE Holdings Sweden AB, Gothenburg (SE)

( * ) Notice: Subject to any disclaimer, the term of this patent is extended or adjusted under 35 U.S.C. 154(b) by 0 days.

(21) Appl. No.: 17/380,512

(22) Filed: Jul. 20, 2021

(65) Prior Publication Data

US 2022/0030041 A1    Jan. 27, 2022

Related U.S. Application Data

(60) Provisional application No. 63/055,423, filed on Jul. 23, 2020.

(51) Int. Cl.
*H04L 29/06* (2006.01)
*H04L 65/1016* (2022.01)
(Continued)

(52) U.S. Cl.
CPC .... *H04M 3/42042* (2013.01); *H04L 65/1016* (2013.01); *H04L 65/1096* (2013.01);
(Continued)

(58) Field of Classification Search
CPC ............. H04L 65/1083; H04L 65/1016; H04L 65/1096; H04L 65/1046; H04L 65/1069;
(Continued)

(56) References Cited

U.S. PATENT DOCUMENTS

| 5,758,286 A | 5/1998 | Leppanen |
| 6,456,234 B1 | 9/2002 | Johnson |

(Continued)

FOREIGN PATENT DOCUMENTS

| EP | 1435720 A2 | 7/2004 |
| WO | WO-2010/073237 A2 | 7/2010 |

(Continued)

OTHER PUBLICATIONS

Notice of Allowance and Fee(s) Due for U.S. Appl. No. 17/408,205, dated Apr. 7, 2022, (12 pages), United States Patent and Trademark Office, USA.

(Continued)

*Primary Examiner* — Shean Tokuta
*Assistant Examiner* — Juan C Turriate Gastulo
(74) *Attorney, Agent, or Firm* — ALSTON & BIRD LLP

(57) ABSTRACT

Computer program products, methods, systems, apparatus, and computing entities are provided for call control. Upon receipt of a voice call initiated by a mobile device, one or more call control rules associated with the phone number through which the voice call was received is determined, and responsive to identifying the one or more call control rules, an alternative communication session is initiated with the mobile device by transmitting a message to the mobile device including a hyperlink to initiate the alternative communication session. The voice call is then suspended and then later terminated upon determining that a user of the mobile device selects the hyperlink to initiate the alternative communication session.

7 Claims, 11 Drawing Sheets

(51) Int. Cl.
- *H04L 65/1096* (2022.01)
- *H04M 3/24* (2006.01)
- *H04M 3/42* (2006.01)
- *H04M 3/436* (2006.01)
- *H04W 4/16* (2009.01)
- *H04W 36/00* (2009.01)
- *G06F 16/955* (2019.01)
- *H04L 65/1083* (2022.01)

(52) U.S. Cl.
CPC ....... *H04M 3/241* (2013.01); *H04M 3/42382* (2013.01); *H04M 3/4365* (2013.01); *H04W 4/16* (2013.01); *H04W 36/00224* (2023.05); *G06F 16/9558* (2019.01); *H04L 65/1083* (2013.01); *H04M 2203/2033* (2013.01)

(58) Field of Classification Search
CPC ............. H04M 3/241; H04M 3/42042; H04M 3/42382; H04M 3/4365; H04M 2203/2033; H04M 3/42093; H04M 2203/252; H04M 2203/256; H04M 2203/651; H04W 4/16; H04W 36/0022; H04W 4/12; G06F 16/9558

See application file for complete search history.

(56) References Cited

U.S. PATENT DOCUMENTS

| | | | |
|---|---|---|---|
| 6,501,948 | B1 | 12/2002 | Salin |
| 7,103,151 | B2 | 9/2006 | Lass et al. |
| 7,197,321 | B2 | 3/2007 | Erskine et al. |
| 7,272,392 | B2 | 9/2007 | Boda |
| 7,353,016 | B2 | 4/2008 | Roundtree et al. |
| 7,362,698 | B2 | 4/2008 | Christensen et al. |
| 7,545,760 | B1 | 6/2009 | Daniel et al. |
| 7,548,915 | B2 | 6/2009 | Ramer et al. |
| 7,710,290 | B2 | 5/2010 | Johnson |
| 8,036,160 | B1 | 10/2011 | Oakes, III |
| 8,238,922 | B2 | 8/2012 | Parameswar |
| 8,243,724 | B2 | 8/2012 | Meriaz et al. |
| 8,275,102 | B2 | 9/2012 | Zheng et al. |
| 8,275,352 | B2 | 9/2012 | Forstall et al. |
| 8,295,801 | B2 | 10/2012 | Ray et al. |
| 8,498,290 | B2 | 7/2013 | Hughston |
| 8,588,214 | B2 | 11/2013 | Meriaz et al. |
| 8,644,485 | B1 | 2/2014 | Vendrow et al. |
| 8,837,696 | B2 | 9/2014 | Meriaz et al. |
| 8,964,731 | B2 | 2/2015 | Meriaz et al. |
| 9,596,566 | B2 | 3/2017 | Meriaz et al. |
| 9,730,053 | B2 | 8/2017 | Meriaz et al. |
| 9,762,733 | B1* | 9/2017 | Ramanujaiaha .. H04M 3/42068 |
| 9,813,898 | B2 | 11/2017 | Meriaz et al. |
| 9,961,195 | B2 | 5/2018 | Meriaz et al. |
| 10,171,657 | B1* | 1/2019 | Anandadoss ..... H04M 1/72445 |
| 10,475,075 | B2* | 11/2019 | Ismail ................. H04M 3/2218 |
| 10,708,434 | B1 | 7/2020 | Scheet et al. |
| 11,082,559 | B1* | 8/2021 | Koneru ................ H04M 3/527 |
| 11,223,540 | B1* | 1/2022 | Lilley ................... H04L 67/306 |
| 2002/0077085 | A1 | 6/2002 | Kalish et al. |
| 2004/0052346 | A1 | 3/2004 | Ohta et al. |
| 2004/0185824 | A1 | 9/2004 | Cheng |
| 2004/0266422 | A1 | 12/2004 | Hotze et al. |
| 2007/0274495 | A1 | 11/2007 | Youd et al. |
| 2008/0133580 | A1 | 6/2008 | Wanless et al. |
| 2008/0205608 | A1 | 8/2008 | Tal et al. |
| 2008/0261603 | A1 | 10/2008 | Sever et al. |
| 2009/0046843 | A1 | 2/2009 | Baciu et al. |
| 2009/0262733 | A1 | 10/2009 | Olson |
| 2011/0176670 | A1 | 7/2011 | Kaplan et al. |
| 2011/0249666 | A1 | 10/2011 | Holbrook et al. |
| 2013/0013750 | A1 | 1/2013 | Butler et al. |
| 2013/0130661 | A1* | 5/2013 | Berner ..................... H04W 4/00 455/414.1 |
| 2013/0210393 | A1 | 8/2013 | Hillier |
| 2013/0308764 | A1* | 11/2013 | Abuelsaad .......... H04L 12/1818 379/93.01 |
| 2014/0329514 | A1 | 11/2014 | Meriaz et al. |
| 2016/0037297 | A1 | 2/2016 | Meriaz et al. |
| 2016/0337516 | A1 | 11/2016 | Runyan |
| 2017/0265065 | A1* | 9/2017 | Meriaz .............. H04M 1/72403 |
| 2020/0162612 | A1* | 5/2020 | Mullane .............. G06Q 30/0202 |
| 2020/0311173 | A1 | 10/2020 | Zhao et al. |
| 2021/0400353 | A1 | 12/2021 | Sodagar |
| 2022/0286560 | A1 | 9/2022 | Landers et al. |

FOREIGN PATENT DOCUMENTS

| | | |
|---|---|---|
| WO | WO-2010/096546 A1 | 8/2010 |
| WO | WO-2013/019003 A2 | 2/2013 |
| WO | WO-2014/179530 A1 | 11/2014 |

OTHER PUBLICATIONS

International Preliminary Examining Authority, International Preliminary Report on Patentability for International Application No. PCT/US2014/036306, dated Jul. 10, 2015, (16 pages), European Patent Office, Rijswijk, The Netherlands.

International Preliminary Examining Authority, Second Written Opinion for International Application No. PCT/US2014/036306, dated Apr. 1, 2015, (7 pages), European Patent Office, Rijswijk, The Netherlands.

International Searching Authority, International Search Report and Written Opinion for International Application No. PCT/US2014/036306, dated Jun. 30, 2014, (9 pages), European Patent Office, Rijswijk, The Netherlands.

Notice of Allowance and Fee(s) Due for U.S. Appl. No. 14/265,730, dated Apr. 11, 2017, (8 pages), United States Patent and Trademark Office, USA.

NonFinal Office Action for U.S. Appl. No. 14/265,730, dated Sep. 21, 2015, (11 pages), United States Patent and Trademark Office, USA.

Final Office Action for U.S. Appl. No. 14/265,730, dated Apr. 18, 2016, (11 pages), United States Patent and Trademark Office, USA.

NonFinal Office Action for U.S. Appl. No. 14/265,730, dated Dec. 23, 2016, (9 pages), United States Patent and Trademark Office, USA.

Final Office Action for U.S. Appl. No. 17/380,625, dated Mar. 28, 2023, (18 pages), United States Patent and Trademark Office, US.

Final Office Action for U.S. Appl. No. 17/380,625, dated Mar. 12, 2025, (17 pages), United States Patent and Trademark Office, US.

* cited by examiner

| KEY | TARGET_NUMBER | SOURCE | COMMUNICATION SESSION | RULE_1 | RULE-2 |
|---|---|---|---|---|---|
| 1 | 1-404-773-0305 | DELTA | http://www.delta.com/us/support/initiatereservationchat | Reservation Calls Between 19:00 - 07:00 EST | Suspend, Open Browser to URL |
| 2 | 1-404-773-0306 | DELTA | http://www.delta.com/us/support/initiatereschedulechat | Flight Change Calls Between 19:00 - 07:00 EST | Suspend, Open Browser to URL |
| 3 | 1-404-773-0307 | DELTA | http://www.delta.com/us/support/statuscheck | Flight Status Calls, All | Suspend, Open Browser to URL |

400

FIG. 4

INBOUND AND OUTBOUND COMMUNICATION SESSION AND CALL CONTROL

CROSS-REFERENCE TO RELATED APPLICATIONS

This patent application claims priority to U.S. Provisional Patent Appl. Ser. No. 63/055,423, filed Jul. 23, 2020, which is incorporated herein by reference in its entirety.

BACKGROUND

The number of applications resident on mobile devices and other computing entities has exploded. With that said, users may decide to download and install applications for third parties regardless of what functionality is available through the applications. Irrespective of whether third party applications are resident on a particular mobile device or computing entity, third parties may desire to direct or control various aspects associated with inbound and/or outbound calls from and to the third parties.

BRIEF SUMMARY

In general, embodiments of the present invention provide methods, apparatus, systems, computing devices, computing entities, and/or the like for communication session call control. Accordingly, in various embodiments, at least one of a mobile device and a remote entity receives a phone number associated with a voice call. The mobile device and/or remote entity determines whether the phone number is one of a plurality of target phone numbers. Responsive to determining that the phone number is one of the plurality of target phone numbers, the mobile device and/or remote entity identifies one or more call control rules associated with the phone number and responsive to identifying the call control rules, (a) initiates a communication session (i) based at least in part on the one or more call control rules, and (ii) in lieu of establishing an voice call, and (b) suspends the voice call. A user of the mobile device may then continue with the communication session in lieu of completing the voice call. If the user decides to continue with the communication session, the mobile device and/or remote entity terminates the voice call.

Certain embodiments are directed to a method for call control of a call initiated by a mobile device, the method comprising: receiving, by a remote computing entity, a voice call placed by a mobile device to a third party computing entity, wherein receiving the voice call comprises receiving a phone number of the mobile device and a phone number of the third party computing entity; identifying, by the remote computing entity, one or more call control rules associated with the phone number of the third party computing entity; responsive to identifying the one or more call control rules associated with the phone number of the third party computing entity, (a) initiating, by the remote entity, a communication session (i) based at least in part on the one or more call control rules, and (ii) in lieu of establishing the voice call between the mobile device and the third party computing entity, and (b) suspending the voice call, wherein a user of the mobile device can continue with the communication session in lieu of completing the voice call; and responsive to the user continuing with the communication session, terminating, by the remote entity, the voice call.

In various embodiments, the one or more call control rules are time dependent rules, and wherein the method further comprises: determining a current time of the voice call and executing the communication session based at least in part on determining an applicable call control rule based at least in part on the current time of the voice call. In certain embodiments, the method further comprises: determining whether the phone number of the mobile device is a known phone number; upon determining that the phone number of the mobile device is a known phone number, retrieving content specific to the phone number of the mobile device; and wherein initiating a communication session comprises transmitting, by the remote entity, the content specific to the phone number of the mobile device. In certain embodiments, initiating a communication session comprises transmitting a text message to the phone number of the mobile device. In various embodiments, the text message comprises a hyperlink configured to cause the mobile device to initiate an alternative communication session with the third party computing entity. In certain embodiments, the hyperlink is specific to the voice call, and wherein detection that the hyperlink has been accessed causes the remote computing entity to terminate the voice call. In various embodiments, the method further comprises determining whether the phone number of the mobile device matches a known phone number associated with the mobile device. Moreover, determining whether the phone number of the mobile device matches a known phone number associated with the mobile device may comprise transmitting the phone number of the mobile device as identified during receipt of the voice call to an operator together with contextual data of the voice call to cause the operator to determine whether the phone number of the mobile device matches a known voice call placed by the phone number.

Certain embodiments are directed to a remote computing entity comprising at least one processor, at least one communication interface, and at least one memory including program code, the at least one memory and the program code configured to, with the processor, cause the remote computing entity to at least: receive a voice call placed by a mobile device to a third party computing entity, wherein receiving the voice call comprises receiving a phone number of the mobile device and a phone number of the third party computing entity; identify one or more call control rules associated with the phone number of the third party computing entity; responsive to identifying the one or more call control rules associated with the phone number of the third party computing entity, (a) initiate a communication session (i) based at least in part on the one or more call control rules, and (ii) in lieu of establishing the voice call between the mobile device and the third party computing entity, and (b) suspend the voice call, wherein a user of the mobile device can continue with the communication session in lieu of completing the voice call; and responsive to the user continuing with the communication session, terminate the voice call.

In certain embodiments, the one or more call control rules are time dependent rules, and wherein the at least one memory and the program code are further configured to, with the processor, cause the remote computing entity to determine a current time of the voice call and executing the communication session based at least in part on determining an applicable call control rule based at least in part on the current time of the voice call. In various embodiments, the at least one memory and the program code are further configured to, with the processor, cause the remote computing entity to: determine whether the phone number of the mobile device is a known phone number; upon determining that the phone number of the mobile device is a known phone number, retrieve content specific to the phone number of the mobile device; and wherein initiating a communication session comprises transmitting the content specific to the phone number of the mobile device.

In various embodiments, initiating a communication session comprises transmitting a text message to the phone number of the mobile device. In some embodiments, the text message comprises a hyperlink configured to cause the mobile device to initiate an alternative communication session with the third party computing entity. In some embodiments, the hyperlink is specific to the voice call, and wherein detection that the hyperlink has been accessed causes the remote computing entity to terminate the voice call. In various embodiments, the at least one memory and the program code are further configured to, with the processor, cause the remote computing entity to determine whether the phone number of the mobile device matches a known phone number associated with the mobile device. In certain embodiments, determining whether the phone number of the mobile device matches a known phone number associated with the mobile device comprises: transmitting the phone number of the mobile device as identified during reception of the voice call to an operator together with contextual data of the voice call to cause the operator to determine whether the phone number of the mobile device matches a known voice call placed by the phone number.

Certain embodiments are directed to a computer program product for call control of a call initiated by a mobile device, the computer program product comprising at least one non-transitory computer-readable storage medium having computer-readable program code portions stored therein for execution by the mobile device, the computer-readable program code portions comprising: an executable portion configured to receive a voice call placed by a mobile device to a third party computing entity, wherein receiving the voice call comprises receiving a phone number of the mobile device and a phone number of the third party computing entity; an executable portion configured to identify one or more call control rules associated with the phone number of the third party computing entity; an executable portion configured to, responsive to identifying the one or more call control rules associated with the phone number of the third party computing entity, (a) initiate a communication session (i) based at least in part on the one or more call control rules, and (ii) in lieu of establishing the voice call between the mobile device and the third party computing entity, and (b) suspend the voice call, wherein a user of the mobile device can continue with the communication session in lieu of completing the voice call; and an executable portion configured to, responsive to the user continuing with the communication session, terminate the voice call.

Certain embodiments are directed to a method for call control of a call initiated by a mobile device, the method comprising: receiving, by a remote computing entity via an application program interface (API)-based communication channel from the third party computing entity, call data of a voice call initiated by a mobile device to the third party computing entity, wherein the call data comprises a phone number of the mobile device and a phone number of the third party computing entity; identifying, by the remote computing entity, one or more call control rules associated with the phone number of the third party computing entity; responsive to identifying the one or more call control rules associated with the phone number of the third party computing entity, (a) transmitting, to the third party computing entity, data causing the third party computing entity to initiate a communication session (i) based at least in part on the one or more call control rules, and (ii) in lieu of establishing the voice call between the mobile device and the third party computing entity, and (b) transmitting, to the third party computing entity, data causing the third party computing entity to suspend the voice call, wherein a user of the mobile device can continue with the communication session in lieu of completing the voice call; transmitting data to the third party computing entity that causes the third party computing entity to terminate the voice call upon receipt of data indicating the user continued the communication session.

In some embodiments, the one or more call control rules are time dependent rules, and wherein the method further comprises: determining a current time of the voice call and executing the communication session based at least in part on determining an applicable call control rule based at least in part on the current time of the voice call. In various embodiments, the method further comprises determining whether the phone number of the mobile device is a known phone number; upon determining that the phone number of the mobile device is a known phone number, retrieving content specific to the phone number of the mobile device; and wherein initiating a communication session comprises transmitting, by the remote entity, the content specific to the phone number of the mobile device.

In various embodiments, initiating a communication session comprises transmitting a text message to the phone number of the mobile device. In certain embodiments, the text message comprises a hyperlink configured to cause the mobile device to initiate an alternative communication session with the third party computing entity. In some embodiments, the hyperlink is specific to the voice call, and wherein detection that the hyperlink has been accessed causes the third party computing entity to terminate the voice call. In certain embodiments, the method further comprises determining whether the phone number of the mobile device matches a known phone number associated with the mobile device. In various embodiments, determining whether the phone number of the mobile device matches a known phone number associated with the mobile device comprises: transmitting the phone number of the mobile device as identified during interception of the voice call to an operator together with contextual data of the voice call to cause the operator to determine whether the phone number of the mobile device matches a known voice call placed by the phone number.

Certain embodiments are directed to a remote computing entity comprising at least one processor, at least one communication interface, and at least one memory including program code, the at least one memory and the program code configured to, with the processor, cause the remote computing entity to at least: receive, via an application program interface (API)-based communication channel from the third party computing entity, call data of a voice call initiated by a mobile device to the third party computing entity, wherein the call data comprises a phone number of the mobile device and a phone number of the third party computing entity; identify one or more call control rules associated with the phone number of the third party computing entity; responsive to identifying the one or more call control rules associated with the phone number of the third party computing entity, (a) transmit, to the third party computing entity, data causing the third party computing entity to initiate a communication session (i) based at least in part on the one or more call control rules, and (ii) in lieu of establishing the voice call between the mobile device and the third party computing entity, and (b) transmit, to the third party computing entity, data causing the third party computing entity to suspend the voice call, wherein a user of the mobile device can continue with the communication session in lieu of completing the voice call; transmit data to the third party computing entity that causes the third party computing entity to terminate the voice call upon receipt of data indicating the user continued the communication session.

In certain embodiments, the one or more call control rules are time dependent rules, and wherein the method further comprises: determining a current time of the voice call and executing the communication session based at least in part on determining an applicable call control rule based at least in part on the current time of the voice call. In various embodiments, the at least one memory and the program code are further configured to, with the processor, cause the remote computing entity to: determine whether the phone number of the mobile device is a known phone number; upon determining that the phone number of the mobile device is a known phone number, retrieve content specific to the phone number of the mobile device; and wherein initiating a communication session comprises transmitting the content specific to the phone number of the mobile device.

In some embodiments, initiating a communication session comprises transmitting a text message to the phone number of the mobile device. In various embodiments, the text message comprises a hyperlink configured to cause the mobile device to initiate an alternative communication session with the third party computing entity. In some embodiments, the hyperlink is specific to the voice call, and wherein detection that the hyperlink has been accessed causes the third party computing entity to terminate the voice call. In certain embodiments, the at least one memory and the program code are further configured to, with the processor, cause the remote computing entity to determine whether the phone number of the mobile device matches a known phone number associated with the mobile device. In various embodiments, determining whether the phone number of the mobile device matches a known phone number associated with the mobile device comprises: transmitting the phone number of the mobile device as identified during interception of the voice call to an operator together with contextual data of the voice call to cause the operator to determine whether the phone number of the mobile device matches a known voice call placed by the phone number.

Some embodiments are directed to a computer program product for call control of a call initiated by a mobile device, the computer program product comprising at least one non-transitory computer-readable storage medium having computer-readable program code portions stored therein for execution by the mobile device, the computer-readable program code portions comprising: an executable portion configured to receive, via an application program interface (API)-based communication channel from the third party computing entity, call data of a voice call initiated by a mobile device to the third party computing entity, wherein the call data comprises a phone number of the mobile device and a phone number of the third party computing entity; an executable portion configured to identify one or more call control rules associated with the phone number of the third party computing entity; an executable portion configured to, responsive to identifying the one or more call control rules associated with the phone number of the third party computing entity, (a) transmit, to the third party computing entity, data causing the third party computing entity to initiate a communication session (i) based at least in part on the one or more call control rules, and (ii) in lieu of establishing the voice call between the mobile device and the third party computing entity, and (b) transmit, to the third party computing entity, data causing the third party computing entity to suspend the voice call, wherein a user of the mobile device can continue with the communication session in lieu of completing the voice call; an executable portion configured to transmit data to the third party computing entity that causes the third party computing entity to terminate the voice call upon receipt of data indicating the user continued the communication session

BRIEF DESCRIPTION OF THE SEVERAL VIEWS OF THE DRAWINGS

Reference will now be made to the accompanying drawings, which are not necessarily drawn to scale, and wherein:

FIG. 4 is a data structure storing telephone numbers (e.g., target telephone numbers), URLs, rules that can be used in accordance with various embodiments of the present invention.

DETAILED DESCRIPTION

Figure 1:
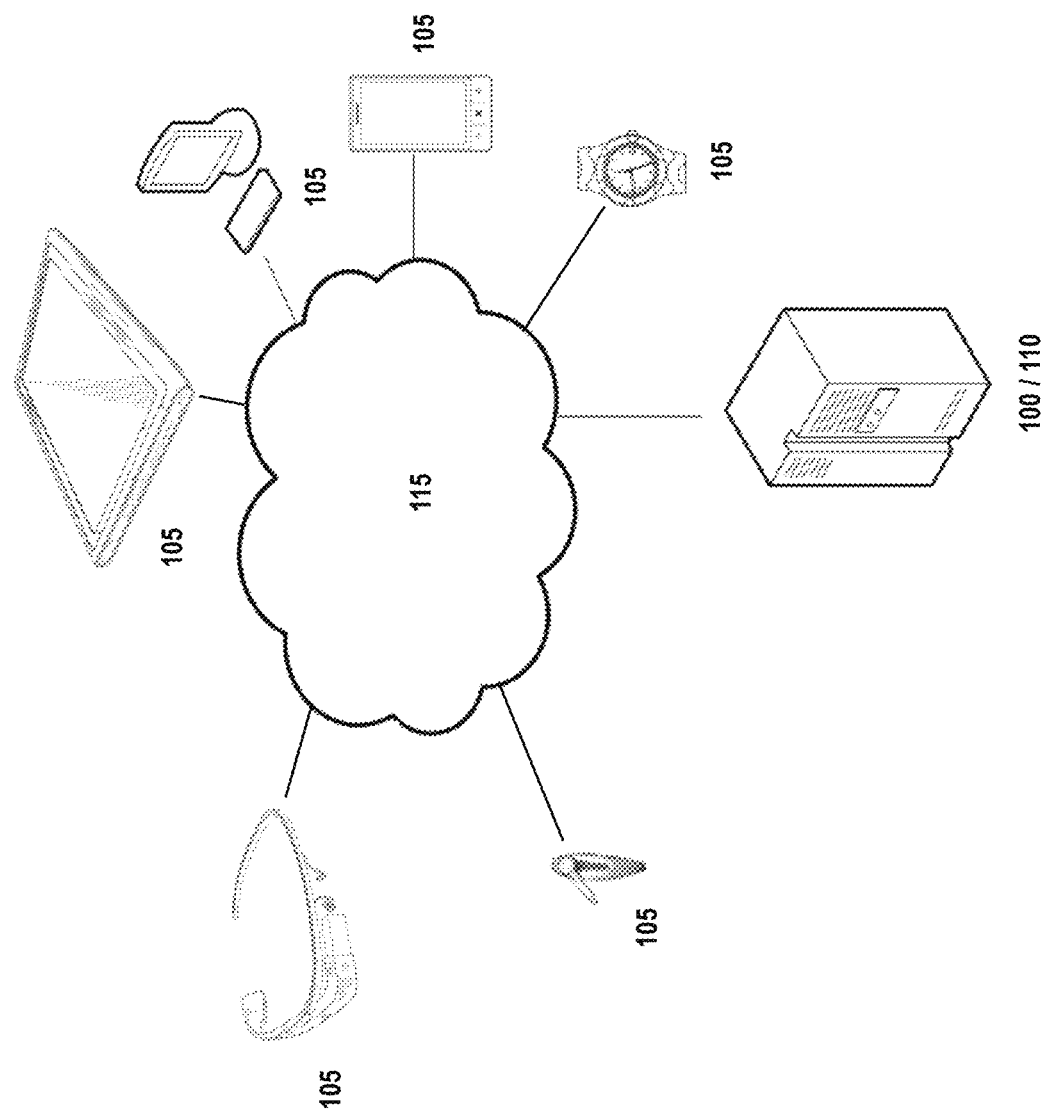
FIG. 1 is a diagram of a system architecture that can be used to practice embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Telephonic communications, particularly those between a business (e.g., a customer-facing business) and a customer have historically failed to take full advantage of the myriad technical advances that have been introduced to mobile telephonic devices (e.g., smartphones with internet connectivity) and therefore telephonic communications have been limited in functionality that is provided purely over the voice-based communication channels that characterize telephonic-based calls. To take advantage of the myriad other communication channels available to internet connected mobile devices, various embodiments enable a call recipient (e.g., a business, operating a computing entity for receiving telephone calls) to selectively direct a caller to an alternative communication channel that may be more efficient for addressing the caller's concerns. For example, upon receipt of a telephone call, the receiving computing entity (or a computing entity that intercepts the telephone call) may identify the call as originating from an internet-connected mobile device, and may transmit a message to the call originator's phone number including a hyperlink directing the caller to an internet-based communication channel (e.g., an online chat with a customer service representative, a webpage for facilitating a particular transaction, and/or the like). Thus, the caller can benefit from the convenience of the online communication channel without requiring the caller to search for the appropriate link online to initiate the online communication channel.

Technical Problem

Telephonic based communication channels are sufficiently disconnected from other, internet-based communication channels that cross-linking between internet-based communication channels and telephone-based communication channels has generally been impossible. Telephone-based communications are voice-based, without direct opportunity for passing visual text or other non-audio data between participants. Moreover, telephone-based communications can occur between a plurality of different devices, including some internet-connected devices and some non-connected devices (e.g., traditional landlines) and thus, the opportunity for initiating alternative communication channels is not universal, creating barriers to universal application of technologies for initiating alternative communication channels for telephone calls.

Technical Solution

To address the above-mentioned technological challenges, among others, various embodiments implement computing systems that exchange data with operators for initially determining whether a device used to originate a call is capable of executing alternative communication channels, and then the call-receiving computing entity (or a call-intercepting computing entity) transmits a message (e.g., using a second, non-internet-based communication channel, such as text messaging) including a hyperlink to initialize the alternative communication channel for communication between the caller and the call recipient. Moreover, the opportunity to communicate with the caller through alternative communication channels enables a call receiving computing entity to selectively suggest alternative communication channels in accordance with one or more rules, such as time-based rules, caller-identity based rules, and/or the like, such that callers receive appropriate service and treatment based at least in part on contextual conditions surrounding their call.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides a diagram of a system architecture that can be used to practice various embodiments of the present invention. As shown in FIG. 1, the system architecture may include one or more call management computing entities 100, one or more mobile devices 105, one or more third-party systems 110, and one or more networks 115. The call management computing entities 100, third-party systems 110, a computing entity of an operator, and/or other computing entities other than the mobile devices 105 may be referred to herein as remote computing entities. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Call Management Computing Entity

Figure 2:
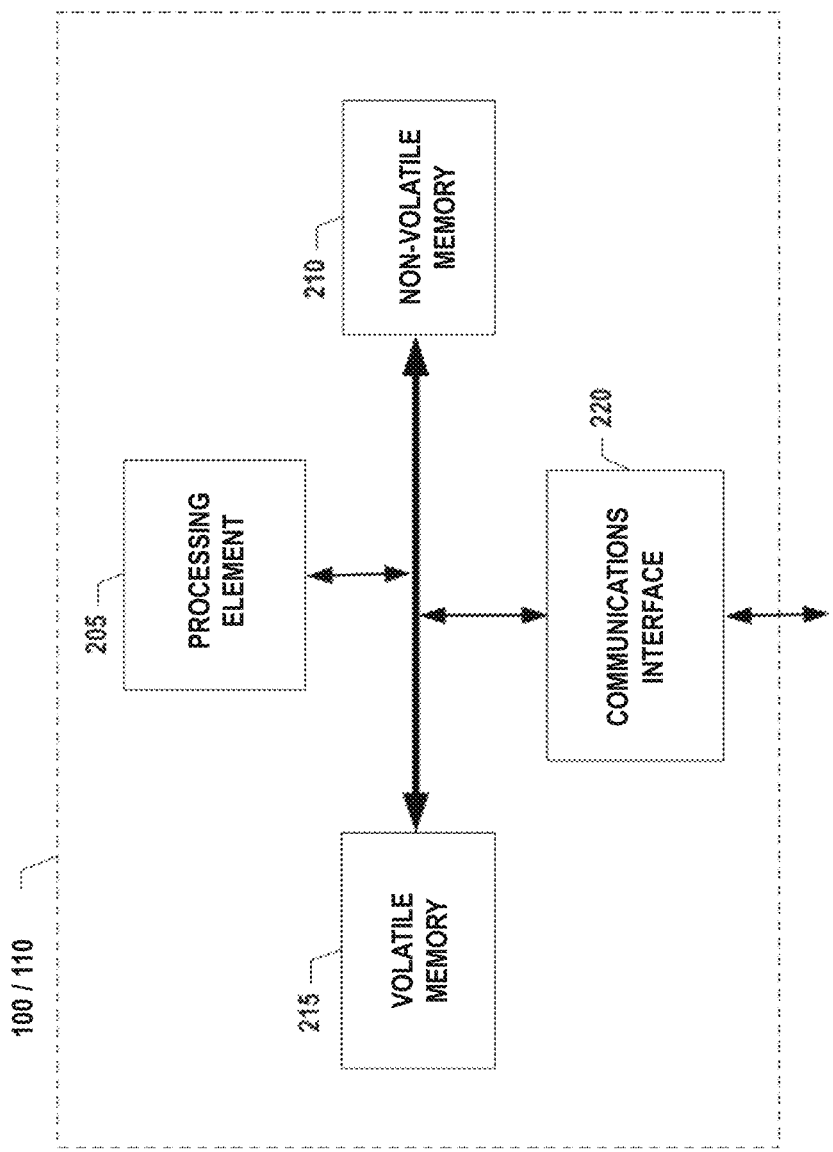
FIG. 2 is an exemplary schematic diagram of a computing entity according to one embodiment of the present invention.

FIG. 2 provides a schematic of a call management computing entity 100 according to one embodiment of the present invention. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the call management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the call management computing entity 100 may include or be in communication with one or more processing elements 205 (also referred to as processors, processing circuitry, and/or similar terms used herein interchangeably) that communicate with other elements within the call management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the call management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the call management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the call management computing entity 100 with the assistance of the processing element 205 and operating system.

As indicated, in one embodiment, the call management computing entity 100 may also include one or more communications interfaces 220 for communicating with or various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the call management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth protocols, wireless universal serial bus (USB) protocols, and/or any other wireless protocol. Via such communication protocols, the call management computing entity 100 can communicate with the mobile device 105, the third-party computing entity 110, and/or various other computing entities.

Although not shown, the call management computing entity 100 may include or be in communication with one or more input elements, such as a keyboard input, a mouse input, a touch screen/display input, audio input, pointing device input, joystick input, keypad input, and/or the like. The call management computing entity 100 may also include or be in communication with one or more output elements (not shown), such as audio output, video output, screen/display output, motion output, movement output, and/or the like.

As will be appreciated, one or more of the computing entity's 100 components may be located remotely from other call management computing entity 100 components, such as in a distributed system. Furthermore, one or more of the components may be combined and additional components performing functions described herein may be included in the call management computing entity 100. Thus, the call management computing entity 100 can be adapted to accommodate a variety of needs and circumstances.

2. Exemplary Mobile Device

Figure 3:
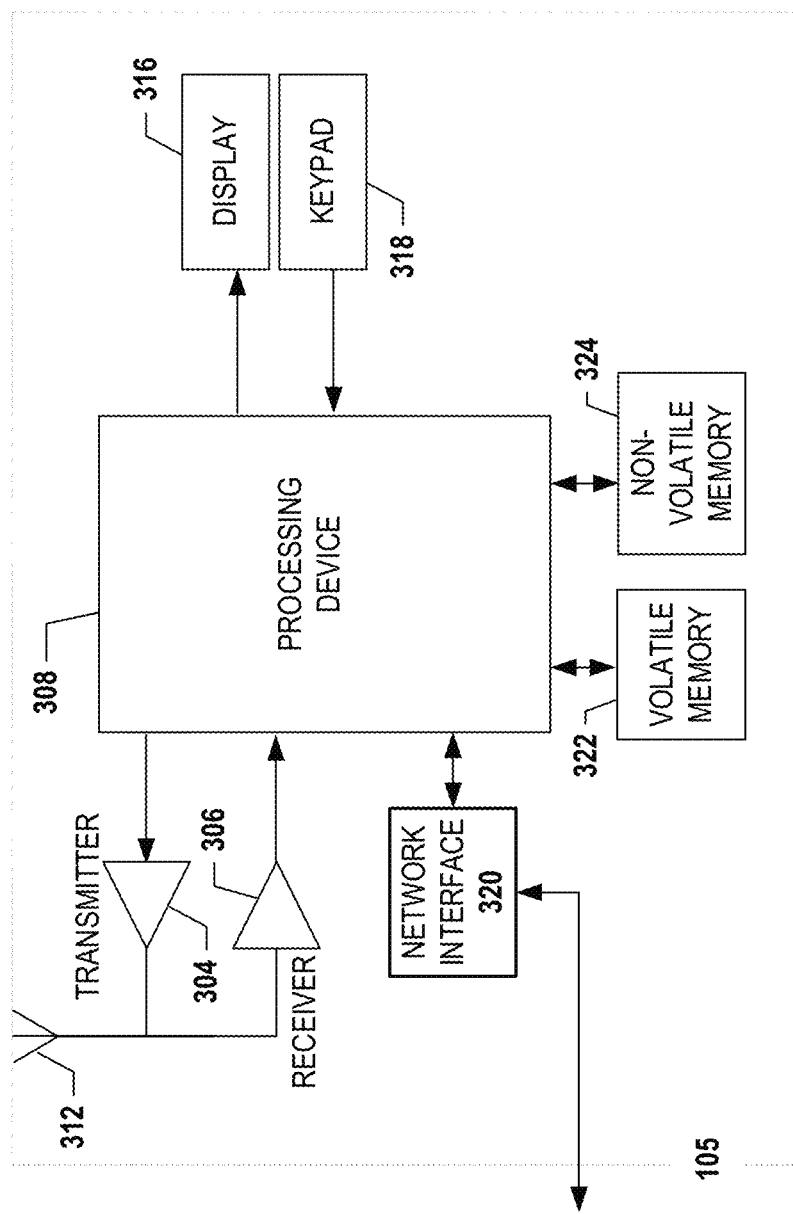
FIG. 3 is an exemplary schematic diagram of a mobile device according to one embodiment of the present invention.

FIG. 3 provides an illustrative schematic representative of a mobile device 105 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the mobile device 105 can include an antenna 312, a transmitter 304 (e.g., radio), a receiver 306 (e.g., radio), and a processing element 308 (such as those described above with regard to the call management computing entity 100) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile device 105 may be capable of operating with one or more air interface standards, communication protocols, modulation types, and access types. More particularly, the mobile device 105 may operate in accordance with any of a number of wireless communication standards and protocols, such as those described above with regard to the call management computing entity 100. In a particular embodiment, the mobile device 105 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, Bluetooth, USB, and/or the like. Via such communication protocols, the mobile device 105 can communicate with the call management computing entity 100, the third-party computing entity 110, and/or various other computing entities.

Via these communication standards and protocols, the mobile device 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile device 105 can also download changes, add-ons, and updates, for instance, to its firmware, software (e.g., including executable instructions, applications, program modules), and operating system. In one embodiment, the mobile device 105 may be executing an application initiating program that is resident on the mobile device 105. In one embodiment, the application initiating program may comprise, be associated with, or be in communication with an application initiating database. The application initiating program may also be associated with or be in communication with the call management computing entity 100 that comprises an application initiating database.

According to one embodiment, the mobile device 105 may include location determining aspects, devices, modules, functionalities, and/or similar words used herein interchangeably. For example, the mobile device 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the mobile device's 105 position in connection with a variety of other systems, including cellular towers, Wi-Fi access points, and/or the like. Similarly, the mobile device 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile device 105 may also comprise a user interface (that can include a display 316 coupled to a processing element 308) and/or a user input interface (coupled to a processing element 308). The user input interface can comprise any of a number of devices allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 105.

In another embodiment, the mobile device 105 may include one or more components that are functionally similar to those of the call management computing entity 100, as described in greater detail above.

3. Exemplary Third-Party Computing Entity

A third-party may be an individual, a family, a company, an organization, an entity, a department within an organization, a representative of an organization and/or person, and/or the like. In one embodiment, each third-party computing entity 110 may include one or more components that are functionally similar to those of the call management computing entity 100 and/or the mobile device 105. For example, each third-party computing entity 110 may include one or more processing elements, one or more display device/input devices (e.g., including user interfaces), volatile and non-volatile storage or memory, and/or one or more communications interfaces. This may enable to the third-party computing entity 110 to communicate with various other computing entities, such as call management computing entities 100, mobile devices 105, and/or various other computing entities. These architectures are provided for exemplary purposes only and are not limiting to the various embodiments. The term computing entity may refer to one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions described herein.

It should also be understood that the third-party computing entity 110 may serve as the call management computing entity 100 in particular embodiments. For example, a third party may implement various embodiments of the invention within its own systems and/or environment. Therefore, in these particular embodiments, third-party computing entity 110 may perform the functionality of the call management computing entity 100 as detailed herein.

III. Exemplary System Operation

Figure 5:
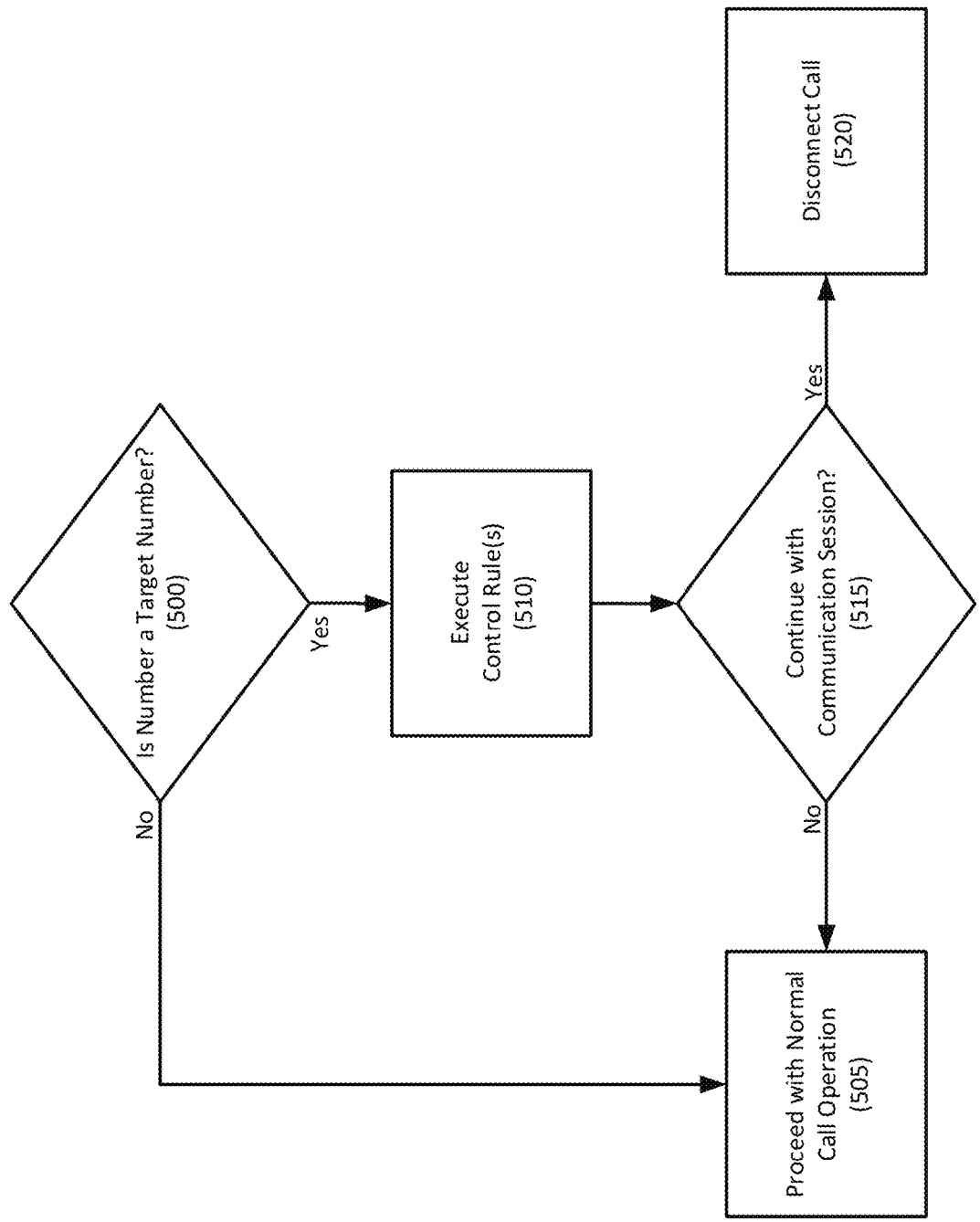
FIG. 5 is a flowchart illustrating operations and processes that can be used in accordance with various embodiments of the present disclosure.
Figure 6:
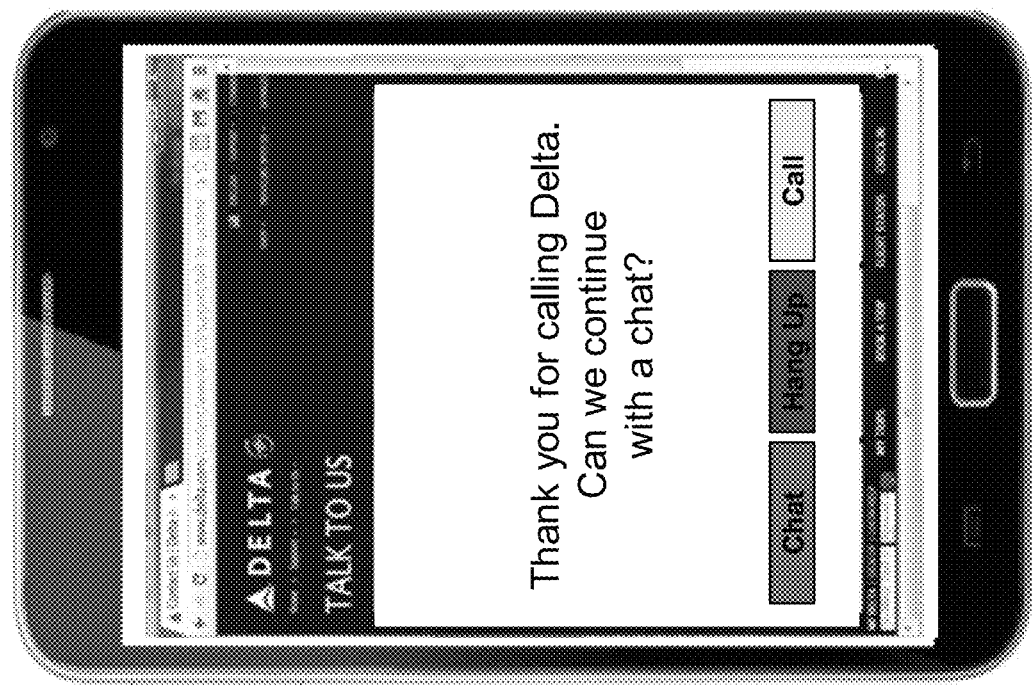
FIGS. 6-8 show exemplary input and output produced by various embodiments of the present invention.
Figure 7:
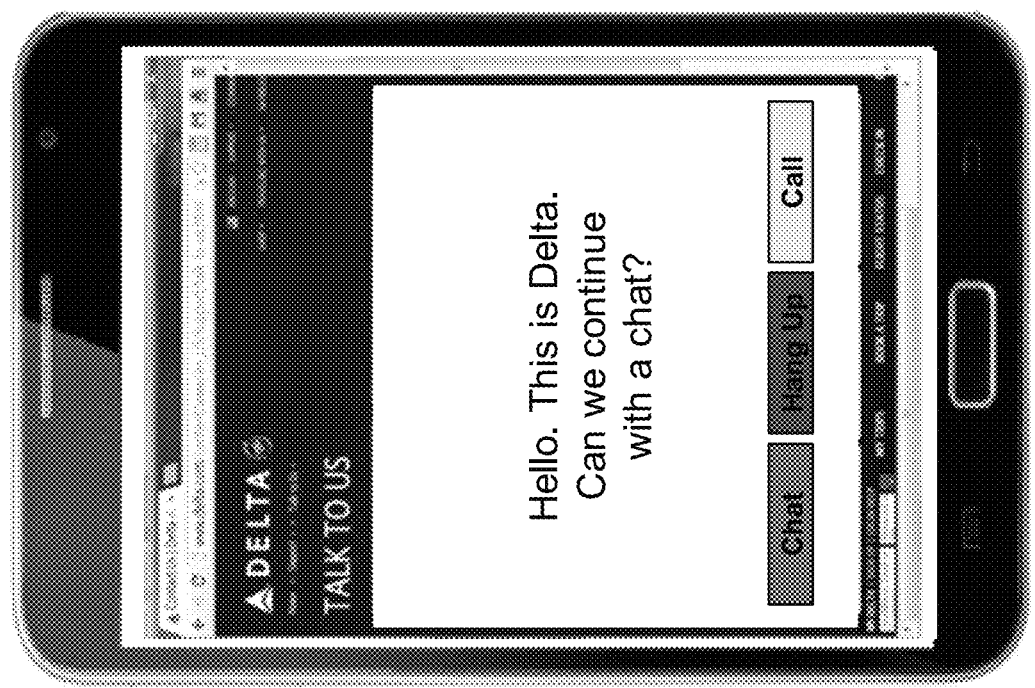
Figure 8:
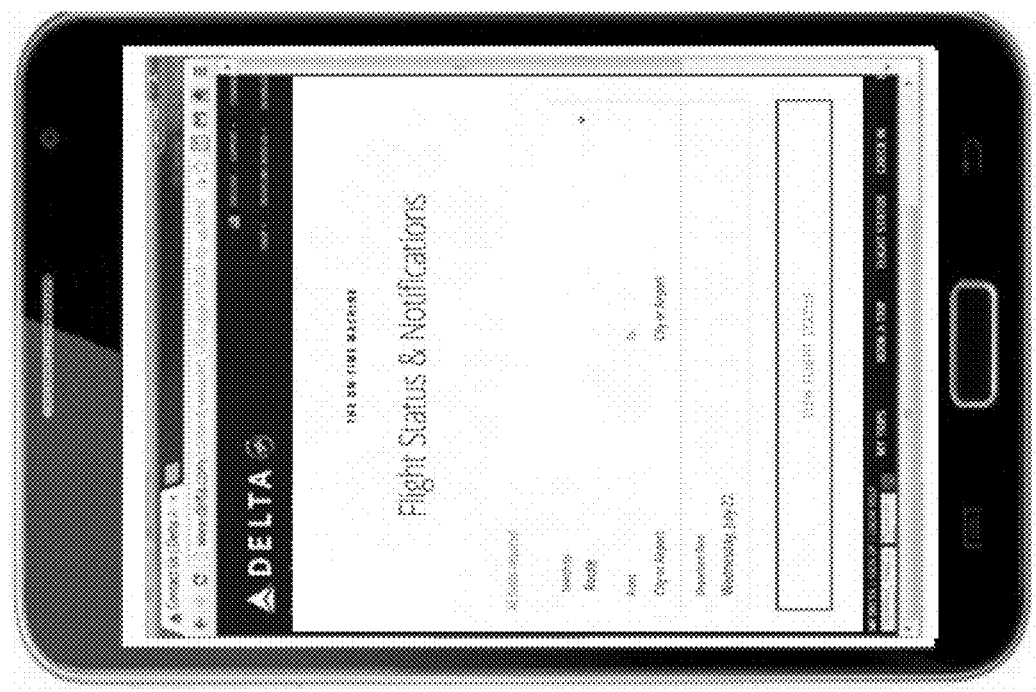

Reference will now be made to FIGS. 4-8. FIG. 4 is an example of the data structure that may be used in accordance with various embodiments of the present invention. FIG. 5 is a flowchart illustrating operations and processes that may be performed for initiating an alternative communication session based at least in part on inbound or outbound telephone phone numbers. FIGS. 6-8 show exemplary input and output produced by various embodiments of the present invention.

1. Registration

In one embodiment, to take advantage of the features described herein, a third party may need to register for services with a call management computing entity 100. The services provided by the call management computing entity 100 may be provided on a fee basis, a subscription basis, a pay-per-use basis, and/or the like. As will be recognized, a variety of other approaches and techniques can be used to adapt to various needs and circumstances. For example, as previously discussed, a third party may implement the functionality of the call management computing entity 100

(or entity similar thereof) within its own systems without the need of an external entity to provide the services of the call management computing entity 100 (e.g., the third-party computing entity 110 may serve as the call management computing entity 100 in various embodiments).

As part of or after registration, the third-party (e.g., operating a third-party computing entity 110) may provide one or more telephone numbers (e.g., one or more target telephone numbers) associated with the third party and for which the third party would like mobile devices 105 (e.g., executing application initiation programs) to perform certain actions before, simultaneous to, during, and/or after calling or receiving a call from such numbers. The target telephone numbers provided by the third-party may be stored by the call management computing entity 100 and/or may be stored locally on one or more mobile devices 105. For example, Delta the airline may be registering and while registering, provide a target telephone number of 1-404-773-0305. As will be recognized, a third party is not limited to providing a single telephone number; rather, multiple telephone numbers (e.g., target telephone numbers) may be registered. The telephone numbers may include country codes, area codes, region codes, and/or the like.

In addition to the one or more target telephone numbers, the third-party may also provide communication session indicators used in redirecting users of mobile devices 105. For instance, such communication session identifiers may identify webpages, applications, text messaging feature, and/or the like. In particular embodiments, the communication session identifiers are used to identify communications sessions that can be used as alternatives to the calls. For example, one or more communication session identifiers may identify: (1) one or more uniform resource locators (URLs) or uniform resource identifiers (URIs) for webpages to which users of mobile devices 105 should be directed; (2) one or more applications such as applications resident on users' mobile devices that should be initiated; and/or (3) one or more features such as the text messaging feature found on a user's mobile device 105. Accordingly, these different communication sessions may used as alternatives to handling calls in response to users of the mobile devices 105 (e.g., executing an application initiation program) calling or receiving calls from target numbers.

For example, Delta's target telephone number 1-404-773-0305 may be used for calls associated with making flight reservations. For a mobile device 105 calling or receiving a call from 1-404-773-0305, Delta may want to initiate a chat session with the user of the mobile device 105 as an alternative to the call. Therefore, Delta may provide a session identifier identifying a first URL (e.g., http://www.delta.com/us/support/initiatereservationchat) the user is directed to by initiating, launching, opening, and/or the like an Internet browser, user application, user interface, and/or the like to the first URL. In addition, Delta's target telephone number 1-404-773-0306 may be used for calls associated with flight schedule changes. For a mobile device 105 calling or receiving a call from 1-404-773-0306, Delta may want to again initiate a chat session with the user of the mobile device 105 as an alternative to the call. Therefore, Delta may provide a session identifier identifying a second, different URL (e.g., http://www.delta.com/us/support/initiateschedulechat) the user is directed to by initiating, launching, opening, and/or the like an Internet browser, user application, user interface, and/or the like to the second, different URL. Further, Delta's target telephone number 1-404-773-0307 may be used for calls associated with checking flight statuses. For a mobile device 105 calling or receiving a call from 1-404-773-0307, Delta may want to direct the user of the mobile device 105 to a flight status webpage on which the user can check the status of a flight as an alternative to the call. Therefore, Delta may provide a session identifier identifying a third, different URL (e.g., http://www.delta.com/us/support/statuscheck) the user is directed to by initiating, launching, opening, and/or the like an Internet browser, user application, user interface, and/or the like to the third, different URL. Readers will appreciate the third-party can establish several different session identifiers identifying communication sessions that can serve as alternatives for calls in light of this disclosure.

In addition to the one or more target telephone numbers and one or more communication session indicators, the third-party may also define one or more call control rules for initiating communication sessions associated with the indicators in response to users of mobile devices 105 calling or receiving calls from the target telephone numbers. For example, Delta may define a call control rule indicating that for any mobile device 105 that calls or receives a call from 1-404-773-0305 between 19:00-07:00 Eastern Standard Time, Delta wants an Internet browser initiated, launched, opened, and/or the like on the mobile device 105 to http://www.delta.com/us/support/initiatereservationchat (e.g., by transmitting a text message to the calling mobile device including a hyperlink to the webpage with the noted URL). This may allow Delta to route calls involving users who are making or changing flight reservations during non-business hours to a webpage to initiate a chat session with the user of the mobile device 105. Customer service representatives may not be available to handle calls during non-business hours. However, Delta may have chatbots available to conduct chat sessions with users to handle flight reservations. Likewise, Delta may define a call control rule indicating that for any mobile device 105 that calls or receives a call from 1-404-773-0306 between 19:00-07:00 Eastern Standard Time, Delta wants an Internet browser initiated, launched, opened, and/or the like on the mobile device 105 to http://www.delta.com/us/support/initiatesechdulechat. Further, Delta may define a call control rule indicating that for any mobile device 105 that calls or receives a call from 1-404-773-0307, Delta wants an Internet browser initiated, launched, opened, and/or the like on the mobile device 105 to http://www.delta.com/us/support/statuscheck. Delta may implement such a call control rule to reduce the number of calls that need to be handled by customer service representatives. Accordingly, such control rules may allow Delta to handle communications with users using alternative options in lieu of voice calls for a variety of purposes.

Thus, a third-party can define multiple control rules involving multiple types of communication sessions in addition to webpages. For example, other types of communications sessions may involve launching an application resident on a user's mobile device 105 to enable functionality found in the application and/or launching a feature found on the user's mobile device 105 such as a text messaging feature. Those of ordinary skill in the art can envision other types of communication sessions that may be utilized in light of this disclosure. In addition, the call control rules may define time frames (e.g., times of day, days of the week, holidays, and/or the like) in which the communication sessions should be initiated or other circumstances defined by the third party. The call control rules may also define whether the mobile device 105 should establish, terminate/block, or suspend calls in addition to taking or carrying out other actions.

In particular embodiments, the target telephone numbers, communication session indicators, call control rules, and/or the like can be stored locally in a data structure such as, for example, a database accessible to the call management computing entity 100. Such a structure 400 is shown in FIG. 4. In such embodiments, the call management computing entity 100 (e.g., in communication with the mobile devices 105) may update the data structure 400 regularly, periodically, continuously, and/or in response to certain triggers. In some embodiments, the data structure 400 can be stored remotely from the mobile devices 105 by the call management computing entity 100. In these particular embodiments, the mobile devices 105 may need to communicate in real time or near real time with the call management computing entity 100 (e.g., via a text message based communication channel) to determine/identify whether a communication session should be initiated with regard to a given phone number. As will be recognized, a variety of other approaches and techniques can be used to adapt to various needs and circumstances.

Functionality provided by the call management computing entity 100, such as directing mobile devices 105 to alternative communication channels, may be performed directly by the call management computing entity 100 or indirectly, by the third party computing entity 110 based at least in part on communications with the call management computing entity 100 (e.g., via an application program interface (API)-based communication). For functionality performed directly by the call management computing entity 100, registration may entail informing an operator (e.g., a telephone service provider) of the third party that calls to specific numbers are to be intercepted and redirected to the call management computing entity 100. In other embodiments, a session initiation protocol (SIP)-based calling network may be utilized by the third party computing entity 110, enabling the third party computing entity 110 and/or the call management computing entity 100 to intercept and redirect calls made to specific numbers to the call management computing entity 100. For functionality provided by the third party computing entity 110 based at least in part on communications with the call management computing entity 100, registration entails establishing an API-based communication channel between the third party computing entity 110 and the call management computing entity 100 enabling the third party computing entity 110 to communicate contextual data of received calls to the call management computing entity 100, thereby enabling the call management computing entity 100 to apply appropriate call management rules and to provide instructional data back to the third party computing entity 110 that causes the third party computing entity 110 to perform appropriate actions to initialize the alternative communication channel with the caller.

2. Communication Session Initiation

Accordingly, in various embodiments, an alternative communication session between a user and a third party may be initiated as a result of the user placing or receiving a call on a mobile device 105 associated with a target telephone number. For instance, a mobile device 105 (e.g., executing a communication session initiation program) placing an outbound call or receiving an inbound call can determine/identify whether the corresponding inbound or outbound number is a target telephone number (Block 500 of FIG. 5). For example, as a user dials a phone number via the mobile device 105, the mobile device 105 (and/or the call management computing entity 100) can determine/identify whether the dialed number is one of a plurality of target numbers listed in the data structure. Such an operation may be performed as the user types in the number or once the user, for example, clicks, pushes, selects, sends via the mobile device 105 to place the call. In other embodiments, the determination may be made upon receipt of the call by the third party computing entity 110 and/or the call management computing entity 100.

Accordingly, the mobile device 105 and/or the call management computing entity 100 can access the local data structure to determine/identify whether the number that is being/was dialed is one of the target telephone numbers. While in another embodiment, the mobile device 105 can transmit the dialed number to the call management computing entity 100 to make such a determination. A variety of other approaches and techniques can be used to adapt to various needs and circumstances.

For instance, as will be recognized, the same can be applied to calls that are received by the mobile device 105. Specially, the mobile device 105 can reference the data structure stored locally upon receiving the call or the call management computing entity 100 may reference the data structure and mark the call appropriately. Depending on the circumstances, the call may be identified as being placed by a target telephone number before or after the call has actually been initiated. For example, the call may be placed and intercepted by a different entity other than who placed the call. This different entity may then identify the call as being placed by a target phone number. While in another example, the entity who is placing the call (e.g., third party) may mark the call before initiating it.

If the inbound or outbound call corresponds to a number that is determined not to be a target telephone number, then the mobile device 105 and/or the call management computing entity 100 allows the call to proceed with normal call operation (Block 505 of FIG. 5). Such normal call operation may include connecting (e.g., establishing) the call between the parties, for example. As will be recognized, a variety of other approaches and techniques can be used to adapt to various needs and circumstances.

However, if the inbound or outbound call corresponds to a number that is determined to be a target telephone number, then the mobile device 105 and/or the call management computing entity 100 can determine/identify what actions (e.g., initiation of an alternative communication session) should be performed based at least in part on one or more call control rules defined for the corresponding target telephone number (Block 510 of FIG. 5). For example, an applicable call control rule may indicate the call should be suspended and a browser should be opened to an identified URL to initiate a chat session between the user and the third party associated with the target telephone number. In another example, the call control rules may indicate that a message should be transmitted to the mobile device including a URL directing a browser resident on the mobile device to open a particular webpage. The URL may be generated specifically for the call (communication session), such that, upon the third party computing entity 110 determining that the URL has been accessed, the third party computing entity 110 and/or the call management computing entity 100 may terminate the call. While in another example, an applicable call control rule may indicate the call should be suspended and an identified application resident on the mobile device 105 should be opened to initiate functionality provided through the application. For example, the application may be opened to a function (screen) that allows the user to query the flight status of an airline flight. Accordingly, other types of communication sessions may be utilized.

Depending on the embodiment, the mobile device 105 may identify the applicable call control rule(s) and determine the action(s) to take. While in other embodiments, the mobile device 105 may receive instructions from the call management computing entity 100 on what action(s) to take. Accordingly, the mobile device takes the appropriate actions based at least in part on the applicable call control rules (Block 510 of FIG. 5) and the user is presented with the alternative communication session.

For example, a call control rule may be defined for Delta for calls regarding flight reservations placed to and/or received from 1-404-773-0305 between 19:00-07:00 Eastern Standard Time should be suspended and an Internet browser on the corresponding mobile device 105 should be initiated and opened to http://www.delta.com/us/support/initiatereservationchat based at least in part on the corresponding communication identifier. Therefore, as a result, the call is not completed but instead, a browser on the user's mobile device 105 is opened to the identified URL found in the data structure for the corresponding call control rule. The user may then receive a request to begin a chat session with the third party and depending on the embodiment, the user may accept/initiate the chat session, continue the call, and/or hang up. As mentioned, the mobile device may require user interaction with a message including a hyperlink directing the browser to the identified URL, and any of the third party computing entity 110, the call management computing entity 100, or the mobile device 105 may then terminate the call automatically, based at least in part on a determination that the user selected the hyperlink in the message provided to the mobile device 105.

At this point, the user may decide to use the alternative communication session or take another action. According, the mobile device 105 determines whether the user has decided to continue with the communication session (Block 515 in FIG. 5). Here, the mobile device 105 may make such a determination based at least in part on a number of different mechanisms. For example, in particular embodiments, the mobile device 105 may receive an affirmation signal (or negation signal) locally from the browser or application or the mobile device 105 indicating whether or not the user has decided to continue with the communication session. While in other embodiments, the mobile device 105 may receive the affirmation signal (or negation signal) from a remote source such as the call management computing entity 100 and/or the third party. In addition, the mobile device 105 may use other mechanisms, such as a timeout threshold for receiving an affirmation signal (or negation signal), in determining whether or not the user has decided to continue with the communication session.

If the mobile device 105 determines the user has decided to continue with the communication session, then the mobile device 105 may disconnect the call (Block 525 in FIG. 5). Accordingly, the mobile device 105 may disconnect/terminate the call using various mechanisms. For example, the mobile device 105 may simply drop the call (hang up), send a signal to the carrier, call management computing entity 100, or third party (third party computing entity 110) to terminate the call, and/or the like. However, if the mobile device 105 determines the user has decided not to continue with the communication session, then the mobile device 105 may then continue processing the call using normal operation (Block 505 in FIG. 5).

However, in some embodiments, the call may be controlled remotely instead of by the mobile device 105. For example, the call management computing entity 100 may send a signal to the mobile device 105 to disconnect/terminate or continue the call. In another example, the call management computing entity 100 may simply disconnect/terminate or continue the call without any involvement of the mobile device 105. Therefore, in these particular embodiments, the mobile device 105 may simply direct the user to the alternative communication session and not have to determine whether or not the user has decided to use the communication session. In another example, the third party who is receiving the call or who placed the call may disconnect/terminate or continue the call based at least in part on the user's decision on whether or not to continue with the communication session. In another example, the carrier being used for the call may send a signal or simply discontinue/terminate or continue the call. Accordingly, the call management computing entity 100, third party, and/or carrier can use various mechanisms in determining whether the user has decided to use the alternative communication session, as well as various mechanisms with respect to disconnecting/terminating or continuing the call. In certain embodiments, the mobile device 105 need not affirmatively direct the user to the alternative communication session. Instead, the third party may transmit a message (e.g., a text message, a WhatsApp® message, and/or the like) to the mobile device 105 (using the telephone number associated with the mobile device 105) including a hyperlink that, when selected by the user, causes the mobile device 105 to initiate the alternative communication session. A variety of other approaches and techniques can be used to adapt to various needs and circumstances.

3. Third Party can Initiate Communication Session

In particular embodiments, in addition to the call management computing entity 100 (e.g., in communication with the mobile device 105) providing instructions to the mobile device 105 (e.g., executing a communication session initiation program) to carry out and/or perform certain actions, the third-party computing entity 110 can also provide such instructions to mobile devices 105. For example, before, simultaneous to, during, and/or after calling a telephone number associated with a mobile device 105, the third-party computing entity 110 can provide instructions to the user's mobile device 105 to initiate an alternative communication session. For example, assume a user calls Delta using his mobile device 105. The call can be intercepted by an intercepting computing entity (by Delta, as the third party computing entity 110; or by the call management computing entity 100), and the intercepting computing entity may provide instructions to the mobile device 105 for carrying out the initiation of an alternative communication session. For example, the intercepting computing entity may send a message using the telephone number associated with the mobile device 105 providing instructions for carrying out the initiation of an alternative communication session, such as via a hyperlink. As will be recognized, the third-party computing entity 110 and/or call management computing entity 100 (e.g., in communication with the mobile device 105) can provide instructions to such mobile devices 105 to carry out and/or perform a variety of actions before, simultaneous to, during, and/or after a call. As will be recognized, a variety of other approaches and techniques can be used to adapt to various needs and circumstances.

a. Intercept by a Call Management Computing Entity 100

Figure 9:
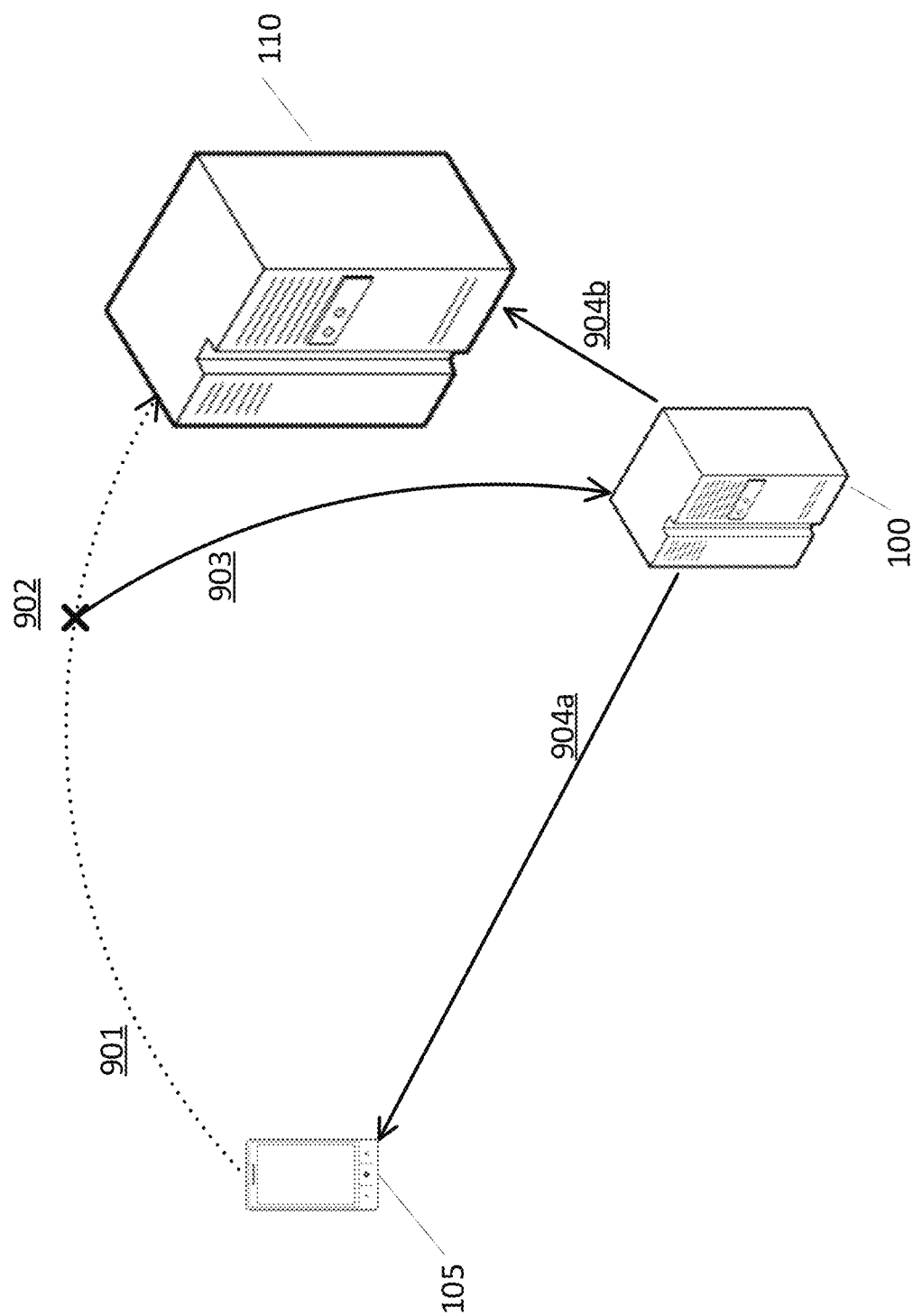
FIGS. 9-10 illustrate communication channels between various entities in accordance with various embodiments.

FIG. 9 schematically illustrates the operation of a methodology by which a third party computing entity 110 utilizes a call management computing entity 100 to intercept calls, apply appropriate call management rules, and for establishing appropriate communication channels between the mobile device 105 and the third party, in accordance with the applicable call management rules.

A user of a mobile device 105 uses the mobile device 105 to initiate a telephonic call to the third party (specifically, to be received by the third party computing entity 110), as indicated by dashed line 901. However, rather than directly connecting the mobile device 105 with the third party computing entity 110, the call is intercepted, as indicated by the "X" designated as 902, and routed to the call management computing entity 100 for call management. The call management computing entity 100 thus receives data indicative of the call initiator's telephone number. In accordance with the embodiment of FIG. 9, the third party may have an agreement in place with the call management computing entity operator, such that calls from mobile devices to known target telephone numbers associated with the third party are to be intercepted, such that the call management computing entity 100 is able to apply call management rules established by the third party and applied by the call management computing entity 100. Example call management rules are discussed in reference to FIG. 4, above.

Intercepting the call may encompass directing calls to a particular telephone number to the call management computing entity 100, and calls to the particular telephone number are received by the call management computing entity 100 such that the call management computing entity 100 may retrieve relevant call management rules to be applied to calls received by the particular telephone number. In other embodiments, intercepting the call may encompass intercepting the call at a switchboard managed by the call management computing entity 100, as the call would typically continue to the third party computing entity 110. In other embodiments, intercepting a telephone call may rely on internet-based calling protocols, such as Voice-over-IP (VoIP) or SIP calling. Under internet-based calling protocols, once a call is received at an SIP trunk of the third party computing entity 110, the call may be directed to an appropriate recipient (thereby intercepting the call), such as to direct the call to the call management computing entity 100.

As indicated at line 903, the intercepted call is routed to the call management computing entity 100. The call management computing entity 100 then retrieves appropriate call management rules to be applied. As mentioned above, the call management rules 100 may be time dependent (e.g., calls received during a particular time period are routed directly to the third party computing entity 110 to complete the call, while calls received outside of the particular time window are managed by the transmission of a message to the initiator telephone number associated with the mobile device 105 providing the option to continue using an alternative communication session). The call management rules may also be call-initiator device dependent. For example, calls from an initiator phone number associated with a landline may be connected directly to the third party computing entity 110, while calls from an initiator phone number associated with a mobile device may be managed by the transmission of a message to the initiator telephone number associated with the mobile device 105 providing the option to continue using an alternative communication session. Other call management rules may be implemented in various embodiments.

As indicated at lines 904a and 904b, the call management computing entity 100 applies the call management rules to provide appropriate communications to the mobile device 105 and/or the third party computing entity 110. As shown, if the call management rules dictate that the call management computing entity 100 is to transmit a message to the mobile device 105 (as reflected at line 904a) suggesting an alternative communication session, the call management computing entity 100 provides the message to the mobile device 105. The content of the message may be retrieved from a memory storage area associated with the call management computing entity 100. The content of the message may be provided by the call management computing entity 100 or the third party computing entity 110, and may be automatically generated, manually generated, or partially automatically generated. In certain embodiments, the content of the message may be specific to the mobile device 105 (as determined based at least in part on the initiator phone number) if the initiator phone number is known to the third party computing entity 110 (as reflected within a memory storage area accessible to the call management computing entity 100). In such embodiments, the caller-specific content may be retrieved from the memory accessible to the call management computing entity by identifying content associated with the initiator phone number. In other embodiments, the content of the message may be caller-agnostic, such that all callers (or all unknown callers) receive a message having identical content. In some embodiments, the content of the message may be unique to a particular phone call (e.g., a URL included within the message may be specific to a particular phone call, thereby enabling the third party computing device 110 to determine if the caller clicks on the URL (by determining whether any web-traffic is directed to the particular URL), and upon determining that the URL has been accessed, the third party computing entity 110 and/or the call management computing entity 100 (based at least in part on data received from the third party computing entity 110 indicating that the URL has been accessed) may terminate the call initiated by the mobile device 105.

As reflected by line 904b, if the call management rules dictate that the mobile device 105 is to be directly connected to the third party computing entity 110 to connect the original call, the call management computing entity 100 relays the call to the third party computing entity 110 to connect the mobile device 105 with the third party computing entity 110. The call may then continue as if the caller was directly connected with the third party computing entity 110, without interception.

b. Intercept by the Third Party Computing Entity 110

Figure 10:
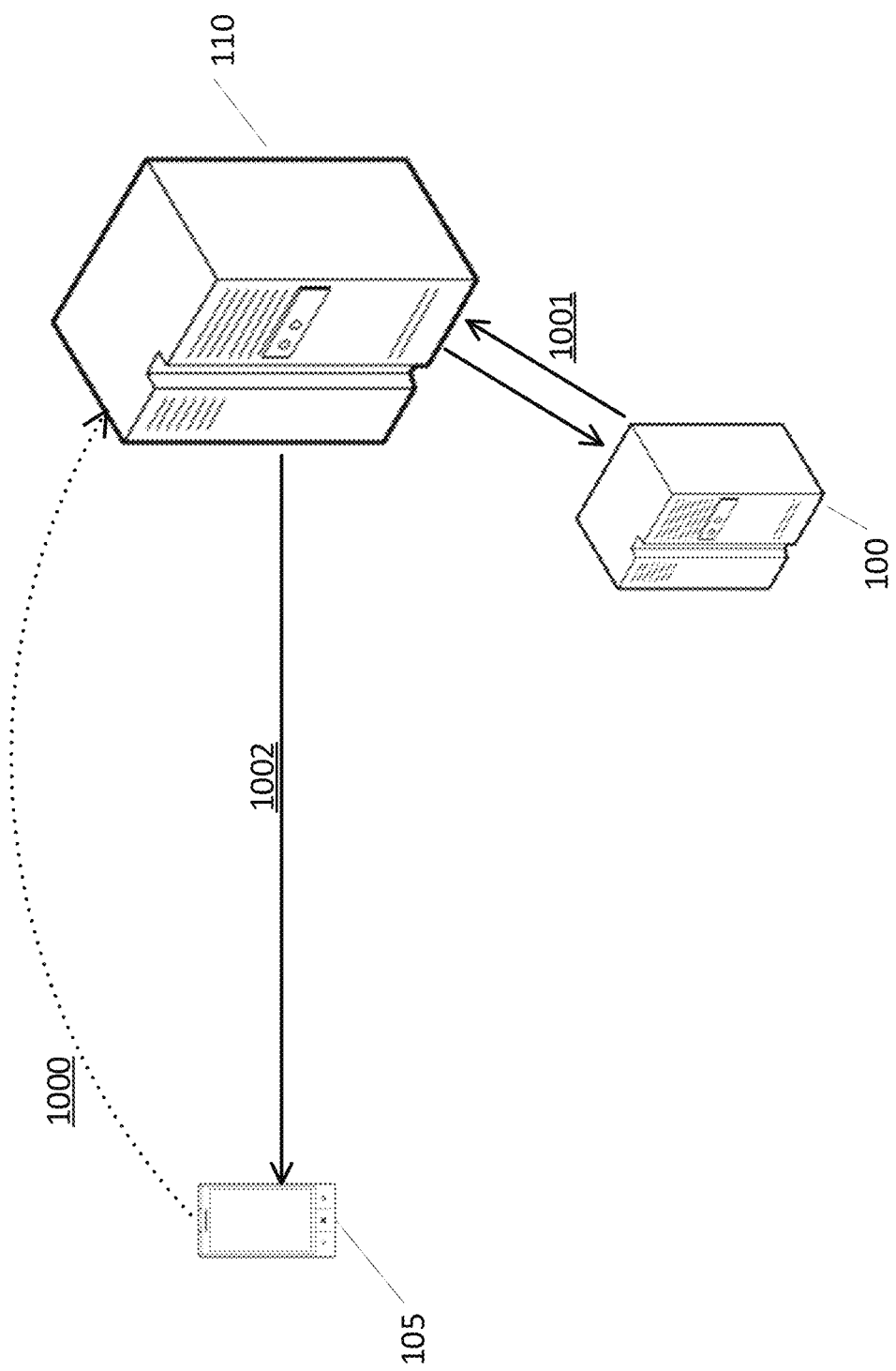

FIG. 10 schematically illustrates a methodology by which the third party computing entity 110 applies call management rules for incoming calls from mobile devices 105, such as by communicating relevant data for determining how to apply relevant call management rules to a call management computing entity 100 via a separate communication channel. As just one example, the third party computing entity 110 is configured to communicate with the call management computing entity 100 via one or more Application Program Interfaces (APIs) that operates to translate data generated by the third party computing entity 110 into a data format consumable by the call management computing entity 100. Data generated and transmitted from the call management computing entity 100 to the third party computing entity 110 may similarly pass through an API such that the data generated by the call management computing entity 100 is consumable by the third party computing entity 110. Under such a configuration, the call management computing entity 100 stores and directly applies the call management rules based at least in part on data about ongoing calls that are received from the third party computing entity 110. Communications between the third party computing entity 110 and the call management computing entity 100 occur in real-time, upon receipt of an incoming call by the third party computing entity 110, such that the call management computing entity 100 provides data to the third party computing entity 110 to enable the third party computing entity 110 to appropriately manage incoming calls in accordance with applicable call management rules (e.g., by transmitting messages back to the caller providing operations for an alternative communication session, by connecting the call according to typical call operations, and/or the like).

As shown in FIG. 10, a user of the mobile device 105 uses the mobile device 105 to initiate a telephonic call to the third party (specifically, to be received by the third party computing entity 110), as indicated by line 1000. The mobile device 105 is directly connected with the third party computing entity 110, which provides the third party computing entity 110 with data indicative of the call initiator mobile device's telephone number.

Upon receipt of a call, the third party computing entity 110 provides data to the call management computing entity 100 (e.g., via an API-based communication channel) indicative of the received call, as indicated at 1001. The provided data additionally comprises data indicative of the receiving telephone number of the third party computing entity 110 (as different receiving telephone numbers have different applicable call management rules).

The call management computing entity 100 then retrieves appropriate call management rules to be applied. As mentioned above, the call management rules 100 may be time dependent (e.g., calls received during a particular time period are routed directly to the third party computing entity 110 to complete the call, while calls received outside of the particular time window are managed by the transmission of a message to the initiator telephone number associated with the mobile device 105 providing the option to continue using an alternative communication session). The call management rules may also be call initiator device dependent. For example, calls from an initiator phone number associated with a landline may be connected directly to the third party computing entity 110, while calls from an initiator phone number associated with a mobile device may be managed by the transmission of a message to the initiator telephone number associated with the mobile device 105 providing the option to continue using an alternative communication session. Other call management rules may be implemented in various embodiments.

The call management computing entity 100 applies the call management rules to determine how the third party computing entity 110 should handle the incoming call, and provides data back to the third party computing entity 110 (e.g., via an API based communication channel), as reflected at 1001. For example, if the call management rules dictate that the third party computing entity 110 is to transmit a message to the mobile device 105 (as reflected at line 1002) suggesting an alternative communication session, the call management computing entity 100 provides data to the third party computing entity 110 instructing the third party computing entity 110 to provide the message to the mobile device 105. The data provided to the third party computing entity 110 may contain the message to be transmitted, or the data provided to the third party computing entity 110 may instruct the third party computing entity 110 to retrieve an appropriate message from a memory accessible to the third party computing entity to transmit to the mobile device 105. In certain embodiments, the content of the message may be specific to the mobile device 105 (as determined based at least in part on the initiator phone number) if the initiator phone number is known to the third party computing entity 110 (as reflected within a memory storage area accessible to the call management computing entity 100 or within a memory storage area accessible to the third-party computing entity 110). In such embodiments, the caller-specific content may be retrieved (e.g., by the call management computing entity 100 or by the third-party computing entity 110) by identifying content associated with the initiator phone number. In other embodiments, the content of the message may be caller-agnostic, such that all callers (or all unknown callers) receive a message having identical content. In some embodiments, the content of the message may be unique to a particular phone call (e.g., a URL included within the message may be specific to a particular phone call, thereby enabling the third party computing device 110 to determine if the caller clicks on the URL (by determining whether any web-traffic is directed to the particular URL), and upon determining that the URL has been accessed, the third party computing entity 110 may terminate the call initiated by the mobile device 105.

If the call management rules dictate that the mobile device 105 is to be directly connected to the third party computing entity 110 to connect the original call, the call management computing entity 110 transmits instructions to the third party computing entity 110 to connect the mobile device 105 with the third party computing entity 110 to complete the call.

4. Caller Identity Security

Figure 11:
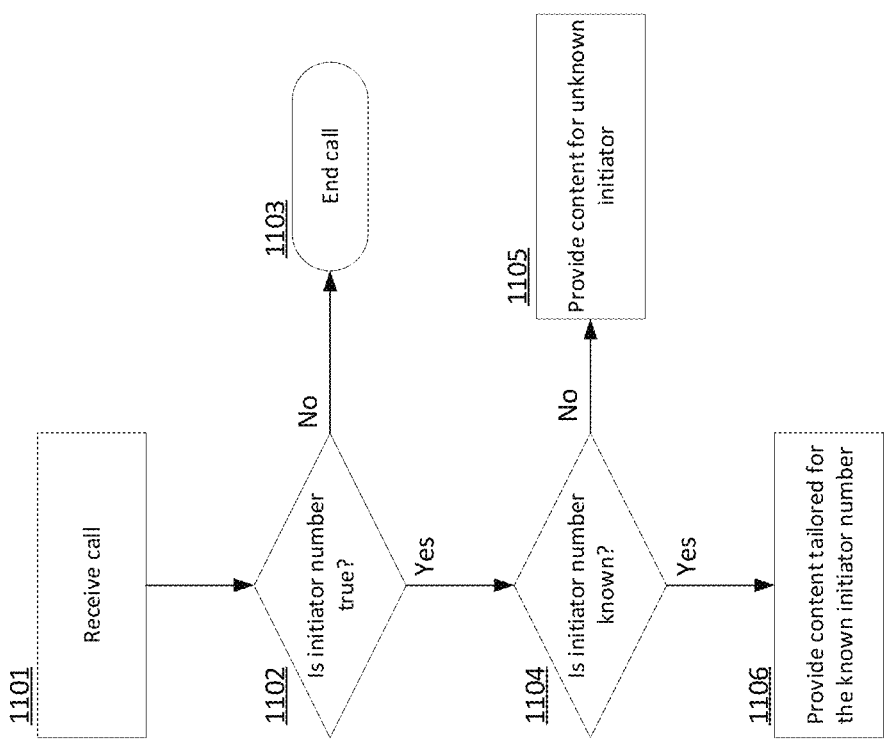
FIG. 11 is a flowchart for securely confirming the identity of a caller in accordance with certain embodiments.

FIG. 11 illustrates an example method for securely confirming the identity of the mobile device 105 calling a third party computing entity 110, such as to ensure that a particular caller's phone number is not being copied, such as for potentially nefarious purposes. Moreover, by confirming the identity of the caller, certain embodiments are able to provide caller-specific functionality, without requiring separate identity confirmation methodologies, such as username/password combinations for ensuring limited access to certain functionality.

As shown in FIG. 11, the caller identity confirmation methodology begins upon receipt of a call (as indicated at 1101), such as from a mobile device 105. It should be understood that the functionality discussed in reference to FIG. 11 may be performed by a call management computing entity 100 and/or a third party computing entity 110, such as via the call intercept or API-based methodologies discussed in reference to FIGS. 9-10.

Receipt of the call encompasses receipt of caller identification data associated with the call, such as an indication of the telephone number from which the call originated (the initiator number). Recognizing that existing technology enables certain callers to hide their actual telephone number, or to emulate other telephone numbers such that a call appears to be originating from a different number, the methodology first determines a likelihood as to whether the initiator number is a true and accurate reflection of the caller, as indicated at Block 1102. For example, a computing entity associated with an operator may review the phone number associated with a phone call, a Subscriber Identity Module (SIM) number associated with a phone call, a Media Access Control (MAC) address, International Mobile Subscriber Identity (IMSI) numbers, IP address, Mobile Equipment Identifiers (MEIDs), unit identifiers (e.g., GPS unit identifiers), Unique Device Identifiers (UDiDs), mobile identification numbers (MINs), IMSI_S (Short IMSIs), Integrated Circuit Card Identifiers (ICCIDs), electronic serial numbers (ESN), International Mobile Equipment Identities (IMEIs), and/or the like. Any of these identifiers (and/or others) may be utilized to determine the identity of a call initiating device. For example, multiple identifiers may be utilized to ensure consistency in the identification of the call initiating device. Upon determining that there is an inconsistency between identifiers, the operator may generate a low likelihood score associated with the determined identity of the call initiator device.

Determining whether the initiator number is true comprises transmitting the initiator number, together with additional data indicative of the context of the received call, to one or more operators (e.g., operators enabling functionality of various telephone numbers) to request confirmation of the initiator of the call. The operators may utilize call history data and/or data indicative of ongoing calls for those numbers for which the operator provides call connectivity services to determine whether the initiator number provided by the third party computing entity 110 or the call management computing entity 100 matches data reflective of an ongoing or historical call of the initiator number. The result may be a binary "TRUE" or "FALSE" determination by a computing entity of the operator, or the output may have an associated prediction score indicative of the likely accuracy of the determination of whether the initiator number received by the third party computing entity 110 or the call management computing entity 100 is correct. As reflected at Block 1103, if it is determined that the initiator number is false, or the prediction score is sufficiently low as to suggest that the initiator number is false, the third party computing entity 110 or the call management computing entity 100 ends the call.

However, if it is determined that the initiator number is true (or the prediction score is sufficiently high as to suggest that the initiator number is true), the third party computing entity 110 or the call management computing entity 100 determines whether the initiator number is known, as reflected at Block 1104. A determination of whether the initiator number is known is conducted to determine whether the initiator number is stored within any profiles associated with users/customers of the third party. For example, a member of an airline rewards program may have a user profile storing the user's telephone number.

If it is determined that the initiator number is not known, generic content may be provided to the caller (e.g., the content being provided via messages or other communication channel, as discussed more specifically in reference to FIGS. 9-10), as indicated at Block 1105. For example, caller-agnostic data may be a link to a program membership sign up page, a link to a general-public chat session, and/or the like.

However, if it is determined that the initiator number is known, the content provided to the caller may be tailored to the caller's identity, as reflected at Block 1106. For example, the content may encompass a link to a user's account for a rewards program, a link to a chat session limited to specific members of a rewards program, and/or the like.

In certain embodiments, the content provided to a caller upon determining that the initiator number is known is not tailored specifically to the caller. Instead, the third party computing entity 110 or the call management computing entity 100 implements a whitelist for providing content to known initiator numbers. Only those initiator numbers present on the whitelist receive specific content, however the content provided to any caller on the whitelist is identical.

5. Example Communication Session Displays

FIGS. 6-8 provide example displays that may be used in accordance with various embodiments of the invention. FIG. 6 is a display that may be provided through a browser to the user on his or her mobile device 105 that provides an alternative communication session via a URL or URI asking the user if he or she would like to continue with a chat session. Accordingly, this display may be provided to the user as a result of the user placing a call to a third party (e.g., Delta) in which the call is associated with a target telephone number. Here, the call is suspended and the display is provided to the user with the options to initiate the alternative communication session (e.g., chat session), hang up, or continue with the call. FIG. 7 is a display that is similar to the display in FIG. 6 but is this instance the third party (e.g., Delta) has initiated the call instead of the user placing the call. Again, the user has the options of initiating the alternative communication session (e.g., the chat session), hanging up, or taking the call. Finally, FIG. 8 provides a display in which the alternative communication sessions is presented as a webpage that can be used by the user to look up the flight status of an airline flight.

As previously detailed herein, the user may decide to continue with the communication session as an alternative to completing the call. Therefore, the call may be suspended while the user is presented with the alternative communication session and is deciding whether or not to continue with the alternative communication session. If the user does decide to continue with the alternative communication session, then the call the be terminated using various processes and/or mechanisms as described herein.

6. Additional Example Use Cases

As discussed above, content may be provided to callers (via their mobile device 105) based at least in part upon a determination that an initiator number is known to the third party computing entity 110 or the call management computing entity 100. This functionality enables a user to call a third party computing entity 110 or a call management computing entity 100 to obtain access to secure data only accessible to the caller, based at least in part on the known number from which the call is placed. As mentioned, a caller may receive access to an account associated with a rewards membership with a particular third party by calling from a recognized phone number. Other use cases enable a user to obtain access to a secure financial account (e.g., associated with a bank or another financial institution) by calling the bank or other financial institution, such that the bank or financial institution transmits a user-specific hyperlink to the initiator number that is executable by a mobile device 105.

Similarly, a user may have a particular telephone number associated with the user's residence, vehicle, other secure location, or another Internet of Things (IoT) connected device or collection of devices. Calling the particular telephone number from a known (whitelisted) initiator number causes the IoT device (via a separate management server, in certain embodiments) to provide a secure hyperlink to the mobile device that initiated the telephone call that provides secure access to control of the functionality of the IoT device. For example, if the IoT device is the user's vehicle, the user may unlock the vehicle, may start/stop the vehicle, and/or the like. If the IoT device is the user's home, the user may turn on/off IoT-enabled lights, may adjust the temperature of an IoT thermostat, may access an IoT enabled camera (e.g., a doorbell camera), may turn on an IoT-enabled appliance (e.g., a coffee maker), and/or may control other functionality of IoT-enabled devices within the home. Each of those IoT devices accessible via the methodology discussed herein may be connected via a common internet-enabled network within the home, and may be in communication (e.g., via appropriate API-enabled communication channels) with a third party computing entity 110 or call management computing entity 100 capable of relying control signals to the one or more IoT enabled devices.

IV. Conclusion

Many modifications and other embodiments of the inventions set forth herein will come to mind to one skilled in the That which is claimed:

1. A method for call control of a call initiated by a mobile device, the method comprising:
receiving, by a remote computing entity via an application program interface (API)-based communication channel from a third-party computing entity, call data of an initiated voice call by a mobile device to the third-party computing entity, wherein the call data comprises a phone number of the mobile device and a phone number of the third-party computing entity;
identifying, by the remote computing entity, one or more call control rules associated with the phone number of the third-party computing entity;
responsive to identifying the one or more call control rules associated with the phone number of the third-party computing entity:
(a) transmitting, to the third-party computing entity, data causing the third-party computing entity to initiate a communication session with the mobile device based at least in part on the one or more call control rules, wherein initiating the communication session comprises causing transmission of a message to the mobile device, and
(b) transmitting, to the third-party computing entity, data causing the third-party computing entity to suspend the initiated voice call instead of connecting the initiated voice call, wherein (i) a user of the mobile device continues with the communication session and (ii) the initiated voice call is not connected while suspended; and
in an instance in which confirmation that the communication session has been activated within a timeout threshold, transmitting data to the third-party computing entity that causes the third-party computing entity to terminate the initiated voice call upon, wherein the initiated voice call is thereafter terminated; and
in an instance in which confirmation that the communication session has not been activated within a timeout threshold, transmitting data to the third-party computing entity that causes the third-party computing entity to allow the initiated voice call, wherein the initiated voice call is thereafter allowed.

2. The method for call control of claim 1, wherein the one or more call control rules are time dependent rules, and wherein the method further comprises: determining a current time of the initiated voice call and executing the communication session based at least in part on determining an applicable call control rule based at least in part on the current time of the initiated voice call.

3. The method for call control of claim 1, further comprising:
determining whether the phone number of the mobile device is a known phone number;
upon determining that the phone number of the mobile device is a known phone number, retrieving content specific to the phone number of the mobile device; and
wherein initiating a communication session comprises transmitting, by the remote entity, the content specific to the phone number of the mobile device.

4. A remote computing entity comprising at least one processor, at least one communication interface, and at least one memory including program code, the at least one memory and the program code configured to, with the processor, cause the remote computing entity to at least:
receive, via an application program interface (API)-based communication channel from a third-party computing entity, call data of an initiated voice call by a mobile device to the third-party computing entity, wherein the call data comprises a phone number of the mobile device and a phone number of the third-party computing entity;
identify one or more call control rules associated with the phone number of the third-party computing entity;
responsive to identifying the one or more call control rules associated with the phone number of the third-party computing entity:
(a) transmit, to the third-party computing entity, data causing the third-party computing entity to initiate a communication session with the mobile device based at least in part on the one or more call control rules, wherein initiating the communication session comprises causing transmission of a message to the mobile device, and
(b) transmit, to the third-party computing entity, data causing the third-party computing entity to suspend the initiated voice call instead of connecting the initiated voice call, wherein (a) a user of the mobile device can continue with the communication session and (b) the initiated voice call is not connected while suspended; and
in an instance in which confirmation that the communication session has been activated within a timeout threshold, transmit data to the third-party computing entity that causes the third-party computing entity to terminate the initiated voice call upon, wherein the initiated voice call is thereafter terminated; and
in an instance in which confirmation that the communication session has not been activated within a timeout threshold, transmit data to the third-party computing entity that causes the third-party computing entity to allow the initiated voice call, wherein the initiated voice call is thereafter allowed.

5. The remote computing entity of claim 4, wherein the one or more call control rules are time dependent rules, and wherein the method further comprises: determining a current time of the initiated voice call and executing the communication session based at least in part on determining an applicable call control rule based at least in part on the current time of the initiated voice call.

6. The remote computing entity of claim 4, wherein the at least one memory and the program code are further configured to, with the processor, cause the remote computing entity to:
determine whether the phone number of the mobile device is a known phone number;
upon determining that the phone number of the mobile device is a known phone number, retrieve content specific to the phone number of the mobile device; and
wherein initiating a communication session comprises transmitting the content specific to the phone number of the mobile device.

7. A computer program product for call control of a call initiated by a mobile device, the computer program product comprising at least one non-transitory computer-readable storage medium having computer-readable program code portions stored therein for execution by the mobile device, the computer-readable program code portions comprising:

an executable portion configured to receive, via an application program interface (API)-based communication channel from a third-party computing entity, call data of an initiated voice call by a mobile device to the third-party computing entity, wherein the call data comprises a phone number of the mobile device and a phone number of the third-party computing entity;

an executable portion configured to identify one or more call control rules associated with the phone number of the third-party computing entity;

an executable portion configured to, responsive to identifying the one or more call control rules associated with the phone number of the third-party computing entity:

(a) transmit, to the third-party computing entity, data causing the third-party computing entity to initiate a communication session with the mobile device based at least in part on the one or more call control rules, wherein initiating the communication session comprises causing transmission of a message to the mobile device, and (b) transmit, to the third-party computing entity, data causing the third-party computing entity to suspend the initiated voice call instead of connecting the initiated voice call, wherein (a) a user of the mobile device can continue with the communication session and (b) the initiated call is not connected while suspended; and an executable portion configured to, in an instance in which confirmation that the communication session has been activated within a timeout threshold, transmitting data to the third-party computing entity that causes the third-party computing entity to terminate the initiated voice call upon, wherein the initiated voice call is thereafter terminated; and an executable portion configured to, in an instance in which confirmation that the communication session has not been activated within a timeout threshold, transmitting data to the third-party computing entity that causes the third-party computing entity to allow the initiated voice call, wherein the initiated voice call is thereafter allowed.

\* \* \* \* \*